United States Patent [19]

Tobler

[11] Patent Number: 4,883,151

[45] Date of Patent: Nov. 28, 1989

[54] TRANSMISSION BRAKE

[76] Inventor: Stephen R. Tobler, Post Office Box 779, Station 'J', Calgary, Alberta, Canada, T2A 6A6

[21] Appl. No.: 197,440

[22] Filed: May 23, 1988

[51] Int. Cl.⁴ .................. B60K 41/26; F16H 47/00
[52] U.S. Cl. ........................ 192/4 A; 74/732
[58] Field of Search ............. 74/732, 752 C, 752 A, 74/473 R; 192/4 A

[56] References Cited

U.S. PATENT DOCUMENTS

| 2,846,901 | 8/1958 | Baule | 192/4 A |
| 2,912,874 | 11/1959 | Quistgaard et al. | 192/4 A |
| 3,038,574 | 6/1962 | Roche | 192/4 A |
| 3,059,504 | 10/1962 | Hill | 74/732 |
| 3,631,950 | 1/1972 | Tanaka | 192/4 A |
| 3,651,904 | 3/1972 | Snoy et al. | 192/4 A |
| 3,994,374 | 11/1976 | Gill | 192/4 A |

FOREIGN PATENT DOCUMENTS 0175848 9/1985 Japan .................. 192/4 A

Primary Examiner—Leslie A. Braun
Assistant Examiner—Harold F. Macris
Attorney, Agent, or Firm—Murray E. Thrift; Stanley G. Ade; Adrian D. Battison

[57] ABSTRACT

An automatic automotive transmission is designed for drag racing. It includes a torque converter and the conventional gear sets, clutches and bands for establishing power transmission paths with different gear ratios through the transmission. The selector valve is modified to provide an additional transmission braking position adjacent the low-speed manual position. In the braking position, two different gear trains are established through the transmission, locking the transmission. This allows the torque converter to be loaded by accelerating the engine without movement of the vehicle. Release of the gear shift lever allows the selector valve to return to the low-speed manual position resulting in high acceleration of the vehicle.

7 Claims, 2 Drawing Sheets

TRANSMISSION BRAKE

FIELD OF THE INVENTION

The present invention relates to automobile transmissions, and more particularly to an automatic transmission with a "trans brake".

BACKGROUND

The torque output of the conventional automotive internal combustion engine is speed dependent, the output torque being maximum at a particular engine speed and falling off to some extent as the speed is either reduced or increased. This creates a range or band of engine speeds within which it is desirable to operate the engine. The conventional automotive automatic transmission is intended to maintain the engine speed within this range.

For use in the sport of drag racing, the conventional automotive automatic transmission has been modified in the past by the addition of a "trans brake". This feature allows the operator of the vehicle to stop the transfer of engine torque through the transmission to the drive shaft. With the trans brake turned on, the operator can, without using the conventional automotive brakes, drive the engine up to a desired speed. The engine loads up against the torque converter included in the transmission so that when the trans brake is released, the vehicle will be driven forward at high acceleration.

In the past, the addition of the trans brake feature to an automatic transmission has involved the installation of a solenoid valve that, when electrically actuated, establishes a second power transmission path through the gear set of the transmission in addition to that set by the usual manual gear selector. When the solenoid power shuts off, the valve returns to a normal position under the influence of a spring. This system is difficult to install. In addition, the solenoid valve is subject to sticking. While the sticking problem could be solved through use of a heavier spring, this also requires greater force from the solenoid coil in order to set the trans brake against the spring force. With a conventional 12 volt automotive system, the requisite power is not available so that relatively light springs and the consequent sticking problems have been endured.

The objective of the present invention is to provide a simpler, more effective trans brake system.

SUMMARY

According to the present invention there is provided an automotive transmission including:
  a torque converter;
  a gear set driven by the torque converter;
  a gear set conditioning means for establishing plural power transmission paths with different transmission ratios through the gear set;
  a selector manually positionable in a plurality of selected positions including a transmission brake position and a plurality of gear positions, the transmission brake position being adjacent a first gear position;
  operating means responsive to the positioning of the selector in the first gear position to operate the gear set conditioning means to establish a first gear power transmission path through the gear set, and responsive to the positioning of the selector means in the transmission brake position to operate the gear set conditioning means to establish the first gear power transmission path and a second power transmission path with a different transmission ratio through the gear set, whereby the gear set is locked;
  means biasing the selector from the transmission brake position to the first gear position whereby on manual release of the selector, the second transmission path is disengaged The trans brake feature is thus provided by modifying the conventional gear selector to provide an additional position in which two gears are engaged. This is located next to the selector position desired for starting so that on release of the spring biased selector, the superfluous transmission path is automatically disengaged and the vehicle is launched forward at high acceleration.

In most transmissions, the modifications required are relatively simple, involving at most machining of the manual valve body and shuttle to provide the desired fluid flows and possibly the change in a stop position for the selector.

BRIEF DESCRIPTION OF THE DRAWINGS

In the accompanying drawings.

DETAILED DESCRIPTION

Figure 1:
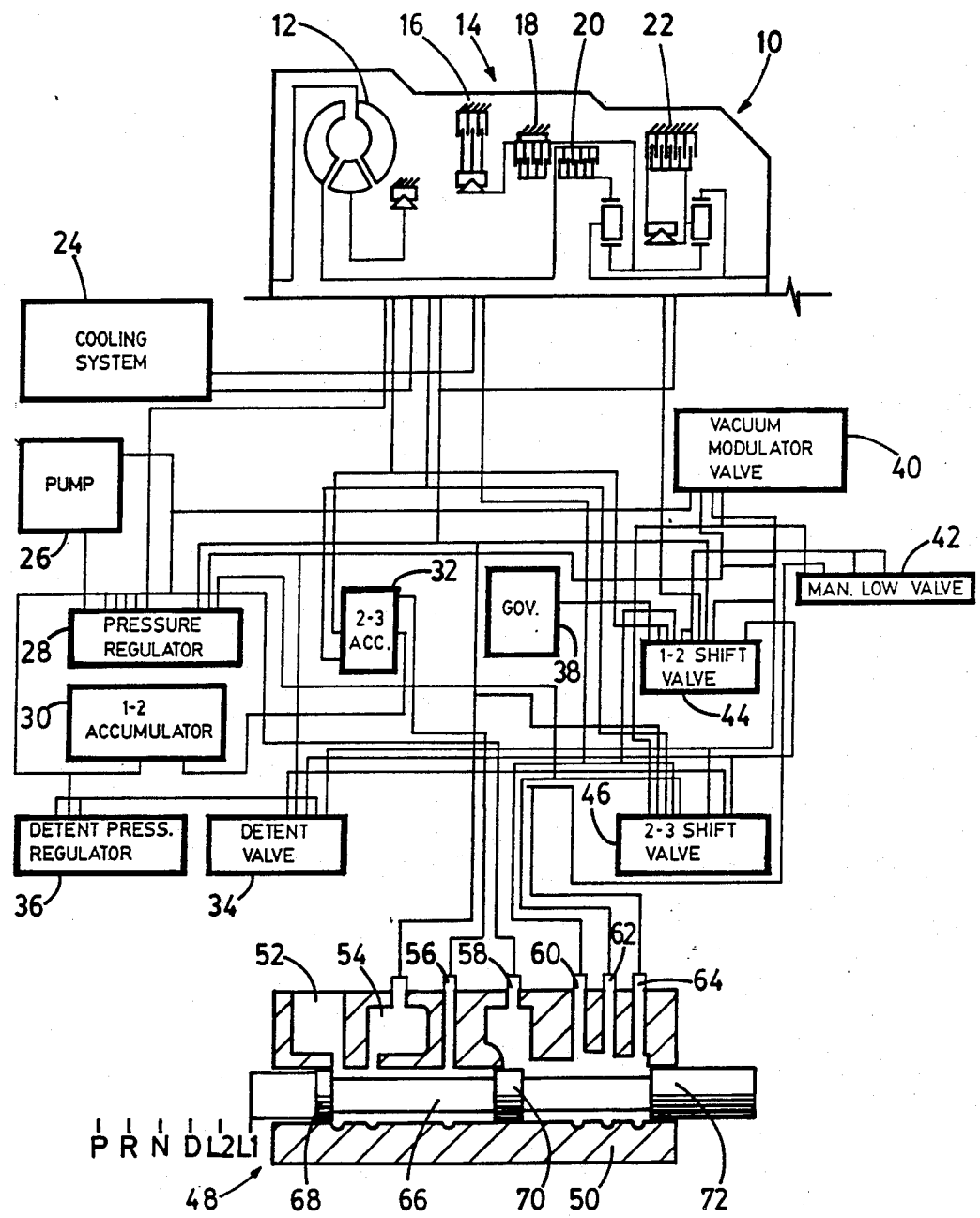
FIG. 1 is a schematic representation of a conventional prior art automatic transmission.

Referring to the accompanying drawings, FIG. 1 illustrates a conventional 3-speed automatic transmission 10 including a torque converter 12 with its output coupled to a gear set 14. The gear set includes a series of planetary gear systems that can, in the usual way, be conditioned to provide various transmission ratios. To effect this conditioning, the transmission includes an intermediate clutch 16, a direct clutch 18, a forward clutch 20 and a low and reverse clutch 22. The physical construction of the transmission is in all respects conventional, so that no additional description is believed necessary.

The transmission has a cooling system 24 and is equipped with the usual hydraulic operating system that includes a pump 26, a pressure regulator 28, two accumulators 30 and 32, a detent valve 34, a detent pressure regulator 36, a governor 38, a vacuum modulator valve 40, a manual low control valve 42, shift valves 44 and 46 and a manual valve 48. The present invention is concerned primarily with modifications to the manual valve 48. This valve in the conventional transmission includes a valve body 50 with an exhaust port 52, a reverse port 54, a reverse, neutral, drive port 56, a line pressure port 58, a drive port 60, an intermediate port 62 and a low port 64. Flow between these ports is controlled with a shuttle 66 that has three lands 68, 70 and 72. The shuttle is movable to low (LI), intermediate (L2), drive (D), neutral (N), reverse (R), and park (P) positions, altering the pressures in the hydraulic system to engage and disengage the clutches 16, 18, 20 and 22 to provide the desired gear ratios through the gear set 14. In FIG. 1, the valve is set to condition the gear set to provide the low speed range LI, a manually set first gear.

Figure 2:
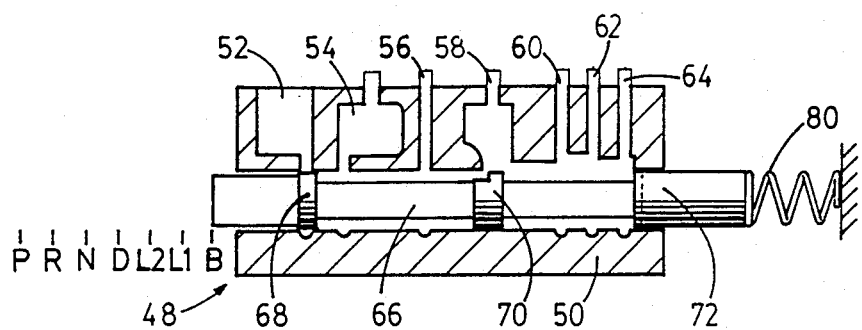
FIG. 2 is a detail showing modifications to a manual valve according to the present invention.

FIG. 2 illustrates the modifications made to the manual valve 48 to provide the desired trans brake characteristic. In the trans brake setting, the valve shuttle 66 is shifted to the right to a brake position (B) from the normal end position illustrated in FIG. 1. This blocks the exhaust port 52 with land 68. Land 70 is milled to allow line pressure to pass to the reverse port 54 and the reverse, neutral, drive port 56. The land 72 has been extended to prevent leakage. When the shuttle is drawn to the illustrated transmission braking position, hydraulic pressure from the line port is applied to the reverse port 54, reverse port 64, neutral, drive port 56, the drive port 60, the intermediate port 62 and the low port 64 all at once. This engages the reverse gear power transmission path as well as the first gear low transmission path through the gear set. The gear set is thus locked against power transmission. When the valve shuttle returns to the manual low position L1, the reverse gear is disengaged and the transmission is freed to transmit power from the torque converter.

Figure 3:
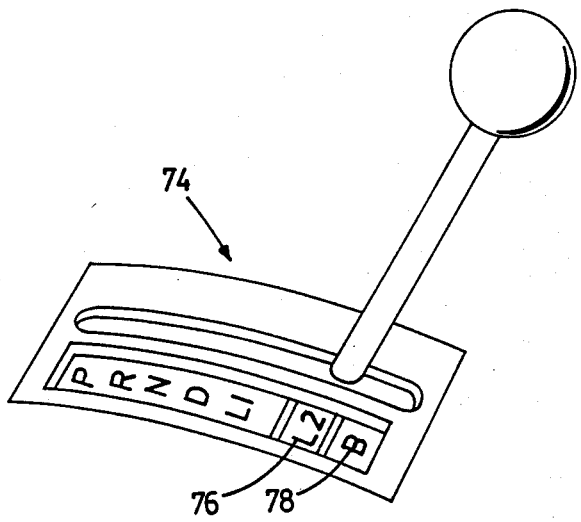
FIG. 3 is an isometric representation of a shifter.

FIG. 3 illustrates a typical shifter for operating the valve 48. The shifter has six standard positions corresponding to positions of the valve 48. These include park, reverse, neutral, drive, second and low, all designated with appropriate indices. The shifter illustrated has been modified so that it can be drawn beyond the low position L1 indicated at 76 to a transmission brake position B shown at 78. This movement shifts the valve 48 to its brake position and stresses a spring 80 (FIG. 2) so that when the shifter is released, both it and the valve will return to the manual low range position L1. A detent may be associated with the shifter to ensure that it does not over shoot the desired position.

In use, the shifter may be drawn to the brake position, the engine accellerated to load the torque converter and, at the appropriate moment, the shifter released to provide a sudden, high accelleration of the vehicle.

While one embodiment of the present invention has been described in the foregoing, it is to be understood that other embodiments are possible within the scope of the present invention. The precise modifications to be made to the manual valve will vary depending on the configuration of the original valve and the construction of the transmission. In the illustrated transmission, the valve has been modified to allow the engagement of both reverse and first gear ratios in the brake position. However, in other transmissions it will be more convenient to engage another gear ratio instead of reverse. The invention is therefore to be considered limited solely by the scope of the appended claims.

I claim:
1. An automotive transmission including:
   a torque converter;
   a gear set driven by the torque converter;
   a gear set conditioning means for establishing plural power transmission paths with different transmission ratios through the gear set;
   a selector manually positionable in a plurality of selected positions, including a transmission brake position and a plurality of gear positions, the transmission brake position being adjacent a first gear position;
   operating means responsive to the positioning of the selector in the first gear position to operate the gear set conditioning means to establish a first gear power transmission path through the gear set, and responsive to the positioning of the selector means in the transmission brake position to operate the gear set conditioning means to establish the first gear power transmission path and a second power transmission path with a different transmission ratio through the gear set, whereby the gear set is locked; and
   means biasing the selector from the transmission brake position to the first gear position whereby on manual release of the selector, the second transmission path is released.

2. A transmission according to claim 1 wherein said gear set comprises a plurality of planetary gear systems.

3. A transmission according to claim 2 wherein the gear set conditioning means comprise a plurality of clutches operable to vary the transmission ratios of the planetary gear systems.

4. A transmission according to claim 3 wherein the clutches are hydraulically operated.

5. A transmission according to claim 4 wherein the operating means include an hydraulic circuit connecting the selector to the clutches.

6. A transmission according to claim 5 wherein the operating means comprise a shuttle valve with a shuttle moveable in a valve body.

7. A transmission according to claim 6 wherein the biasing means comprise means biasing the shuttle from a brake position to a first gear position in the valve body.

* * * * *